(12) United States Patent
Buchanan (10) Patent No.: US 7,472,821 B1
(45) Date of Patent: Jan. 6, 2009

(54) METHODS AND APPARATUS FOR IDENTIFYING A SOURCE OF CONTENT

(75) Inventor: James Gardner Buchanan, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 465 days.

(21) Appl. No.: 11/221,053

(22) Filed: Sep. 7, 2005

(51) Int. Cl.
*G06F 17/00* (2006.01)
(52) U.S. Cl. .................. 235/375; 235/382; 235/487
(58) Field of Classification Search .......... 235/375, 235/382, 382.5, 487; 705/67, 44
See application file for complete search history.

(56) References Cited

U.S. PATENT DOCUMENTS

| | | |
|---|---|---|
| 2002/0035578 A1 | 3/2002 | Stratigos et al. |
| 2004/0044627 A1 | 3/2004 | Russell et al. |
| 2004/0122730 A1* | 6/2004 | Tucciarone et al. ........... 705/14 |
| 2005/0097061 A1* | 5/2005 | Shapiro et al. ................ 705/67 |
| 2006/0026588 A1 | 2/2006 | Iiowsky et al. |
| 2006/0116918 A1* | 6/2006 | Flora et al. ..................... 705/8 |
| 2007/0124248 A1* | 5/2007 | Stoker ......................... 705/51 |

* cited by examiner

*Primary Examiner*—Thien Minh Le
*Assistant Examiner*—Edwyn Labaze
(74) *Attorney, Agent, or Firm*—Chapin IP Law, LLC; Barry W. Chapin, Esq.

(57) ABSTRACT

A system renders content by detecting a command to render content. The system determines if a policy associated with the content indicates that a rendition of the content requires a content code. The system then communicates with a policy server to allow production of the content code for inclusion within the rendition of the content. The content code is decipherable to identify historical characteristics of the rendition of the content. The system produces a rendition of the content that includes the content code.

25 Claims, 8 Drawing Sheets

208 DETERMINE IF A POLICY ASSOCIATED WITH THE CONTENT INDICATES THAT A RENDITION OF THE CONTENT REQUIRES A CONTENT CODE

209 OBTAIN THE POLICY ASSOCIATED WITH THE CONTENT

210 OBTAIN, IN ASSOCIATION WITH THE CONTENT, THE POLICY ASSOCIATED WITH THE CONTENT

OR

211 COMMUNICATE WITH A POLICY SERVER TO OBTAIN THE POLICY ASSOCIATED WITH THE CONTENT

212 AUTHENTICATE THE POLICY ASSOCIATED WITH THE CONTENT

213 ASSESS THE POLICY WITH RESPECT TO THE RENDITION OF THE CONTENT TO DETERMINE IF THE CONTENT RENDITION IS REQUIRED TO CONTAIN A CONTENT CODE

214 DETERMINE IF THE POLICY ASSOCIATED WITH THE CONTENT INDICATES THE COMMAND TO RENDER THE CONTENT HAS BEEN MADE WITHIN A PREDETERMINED TIME PERIOD OF EXPIRATION OF THE POLICY

OR

215 IDENTIFY THAT THE DETECTED COMMAND IS A COMMAND FOR WHICH THE RENDITION OF THE CONTENT IS REQUIRED TO INCLUDE A CONTENT CODE

FIG. 4

216 COMMUNICATE WITH A POLICY SERVER TO ALLOW PRODUCTION OF THE CONTENT CODE FOR INCLUSION WITHIN THE RENDITION OF THE CONTENT, THE CONTENT CODE DECIPHERABLE TO IDENTIFY HISTORICAL CHARACTERISTICS OF THE RENDITION OF THE CONTENT

217 SEND A REQUEST TO THE POLICY SERVER TO OBTAIN THE CONTENT CODE, THE REQUEST IDENTIFYING THE COMMAND PROVIDED BY A USER TO RENDER THE CONTENT

218 RECEIVE THE CONTENT CODE FROM THE POLICY SERVER

219 EMBED THE CONTENT CODE WITHIN THE RENDITION OF THE CONTENT

220 PROVIDE THE POLICY SERVER WITH INFORMATION NECESSARY FOR THE POLICY SERVER TO LOG THE TRANSACTION OF RECEIPT OF THE CONTENT CODE

FIG. 5

221 PRODUCE A RENDITION OF THE CONTENT THAT INCLUDES THE CONTENT CODE

222 APPLY THE CONTENT CODE TO THE RENDITION OF THE CONTENT SO THAT THE CONTENT CODE IS VISIBLE IN CONJUNCTION WITH THE RENDITION OF THE CONTENT

223 APPLY THE CONTENT CODE TO THE RENDITION OF THE CONTENT AS A WATERMARK ON THE CONTENT

OR

224 APPLY THE CONTENT CODE TO THE RENDITION OF THE CONTENT IN AT LEAST ONE AREA WHERE THE RENDITION OF THE CONTENT IS VOID OF CONTENT

METHODS AND APPARATUS FOR IDENTIFYING A SOURCE OF CONTENT

BACKGROUND

Conventional computerized devices, such as personal computers, laptop computers, and the like are able to track the source of a printed document, for example, by printing a separate cover sheet along with the printed document. The separate cover sheet contains information such as the account from which the document was printed (i.e. the user name of the user who printed the document), a timestamp indicating the date and time the document was printed, the document name, the absolute pathname of the document (i.e. where on the user's computer, the document resides), the number of pages in the document, and the printer name of the printer to which the document was sent.

The separate cover sheet, containing information related to the printing of the document, is especially useful when several users are printing documents to a shared printer. The separate cover sheet serves as a separator between the documents enabling the users to differentiate where one document ends, and the next document begins. The separate cover sheet also serves to aid a single user in identifying his or her different printed documents when multiple documents have all been queued up on a printer.

SUMMARY

Conventional technologies for identifying information concerning the source of a document, such as printing information on a separate cover sheet along with the document, suffer from a variety of deficiencies. In particular, conventional technologies for printing information on a cover sheet are limited in that the cover sheet is easily separated from the printed document with which the cover sheet is associated, rendering the information recorded on the cover sheet virtually useless. For example, if a document is lost or stolen, there's no way to trace the historical characteristics of that document (i.e. the user account from which it was printed, the printer where the document was printed, the timestamp of the printing of the document, the source location on a computerized device from which the document was printed, etc.) because that information for that document is contained on a separate cover sheet. That separate cover sheet can be lost, or swapped with a different cover sheet, in an effort to cover up a breech in security. If the cover sheet is removed and a confidential document is discovered as having been printed, there is no way to trace that printed document back to the source of the leak or security breech. Additionally, if the cover sheet of a confidential document gets into the wrong hands, information contained within the cover sheet might aid hackers. For example, a cover sheet could specify a directory in which the document resides on a particular computerized device such as a server. This may provide information that a malicious computer user might not otherwise know, but now gives that person a location to seek other confidential documents.

Embodiments disclosed herein significantly overcome such deficiencies and provide a system that includes a computer system executing a content rendering process. The content rendering process detects a command to render content, and determines if a policy associated with the content indicates that a rendition of the content requires a content code. The content rendering process communicates with a policy server to allow production of the content code that is to be included in the rendition of the content. The content code identifies historical characteristics of the rendition of the content. The content rendering process then produces a rendition of the content that includes the content code.

During an example operation of one embodiment, suppose a user wants to access and print a controlled document. As the user attempts to open the controlled document using a software application for viewing or printing by that user, the content rendering process detects the command to open the controlled document. The content rendering process determines that a policy associated with the controlled document indicates that a content code is required to open and view or print this controlled document. The content rendering process communicates with a policy server to obtain the content code that will allow the user to open and print or otherwise view the controlled document. The content rendering process produces a rendition of the controlled document that includes the content code. When the user opens the controlled document, the content code is visible in relation to the instance of the electronically rendered content of the controlled document. What is meant herein by the rendered content including or containing a content code that is visible to the user is that the content code is rendered either nearby (e.g. in the margin) of the content from the controlled document, or is rendered in an overlapping manner such as being embedded as a watermark or code within the rendered content. The details of the content code generation process and the content rendering process are transparent to the user, except for the content code that's visible on or in relation to the rendition of the content of the controlled document. Since the content code is visible to the user either on an electronically displayed version of the content that is then printed, the content code is also visible on the printed version of the document, and if used in conjunction with a policy server that generates the content code, the content code can identify, for example, a document ID, the user who printed the document, and the print event and other details.

In one configuration, the information contained within the content code is not decipherable to a user and the content code can be an encoding or representation of a large amount of information such as the identity of the user, the identify of the computer from which the print event originated, an identity of the content that is being printed (such as a path and file name of the document), and identity of the application submitting the print event, a time and date stamp, and possible other information. As an example, the content code may be a pattern of dots or glyphs or a bar code or a numeric or other character sequence that is placed on or nearby the rendered content from the controlled document. The user can see the content code, but in one embodiment, it does not have a format that is readily understandable to that human user. Thus, if a controlled document containing the content code fell into the wrong hands, no additional information would be gleaned from the information contained within the content code.

In another example configuration, the steps of communicating with the policy server, and determining if that controlled document requires a content code to access the document, are both performed prior to the user attempting to access the controlled document. In this example configuration, the content rendering process periodically obtains the policy from the policy server. The policy obtained from the policy server indicates a time period (i.e. the policy includes an expiration date) during which content codes may be generated for the controlled document by a local computer system that renders (e.g. views or prints) the content. Thus, when the user attempts to access the controlled document using his or her local computer, the system described herein generates the content code for the controlled document (based on the policy), and applies the code to the controlled document. The system then stores the content code locally, to be sent to the policy server at a later time. Thus in one configuration, the policy contains a "expiring lease" that the content rendering process obtains in the policy that enables the content rendering process to generate a content code locally, apply the content code to rendered content (viewed or printed), and to store the generated content code for transmission back to the policy server upon some subsequent communication with the policy server.

For example, if a user attempts to access a controlled document on a laptop that is not connected to a network, the content rendering process would have previously connected to the policy server (when the laptop was previously connected to a network) to obtain the policy associated with this controlled document. The policy has an expiration date associated with it, meaning the user has permission to access (view or print) the controlled document during a specified period of time. If the user accesses the document during this specified period of time, the content rendering process generates the content code for the controlled document (based on the previously obtained policy), and applies the content code to the controlled document as explained above. The content code is stored locally on the laptop and is transmitted to the policy server once the laptop is connected back to a network. In one example configuration, a separate content code is generated each time the user accesses or prints the controlled document. Each of these content codes is transmitted to the policy server once the laptop is connected to the server.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
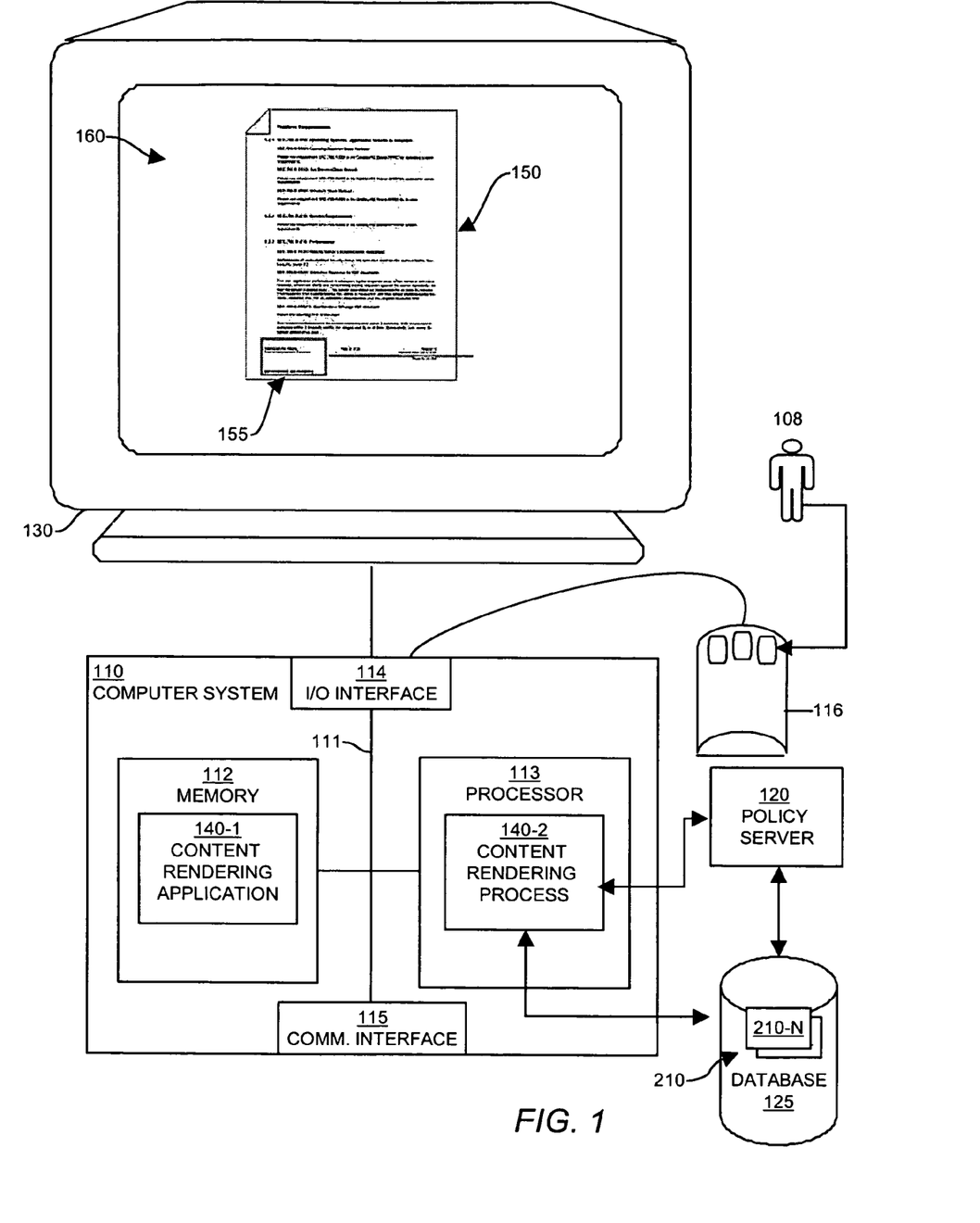
FIG. 1 shows a high-level block diagram of a computer system according to one embodiment disclosed herein.

Embodiments disclosed herein include methods and a computer system that perform a content rendering process. The content rendering process detects a command to render content, and determines if a policy associated with the content indicates that a rendition of the content requires a content code. The command may be any type of input such as a print command, or a command to open a file or document, or a command to print to a file that causes the content rendering process in the computer system to activate for rendering (i.e. displaying or outputting to a file) the content. The content rendering process can detect the command from a user or from another software process executing in the computer system. Upon detection of the command, the content rendering process communicates with a policy server to allow production of the content code that is to be included in the rendition of the content. The content code identifies historical characteristics of the rendition of the content. The content code is an encoding of historical characteristics that can include any information related to the production of the rendition of the content in response to the detection of the command. As an example, the historical characteristics encoded within the content code can include the identity of the user, a timestamp of the command, a path and filename of the document or file from which the content is rendered, an identity of a computer system and/or software application from which the command originated, an identify of the output device to which the rendition of the content is produced, and so forth. The content rendering process then produces a rendition of the content that includes the content code. By including the content code that encodes the historical characteristics within the rendition of the content, the historical characteristics are thereafter decipherable (but only with the assistance of the policy server that maintains a database of content codes matched to historical characteristics of each rendition produced) to determine such things as when, where, who and how the rendition of the content was produced. FIG. 1 is a block diagram illustrating example architecture of a computer system 110 that executes, runs, interprets, operates or otherwise performs a content rendering application 140-1 and content rendering process 140-2 for use in explaining example configurations disclosed herein. The computer system 110, that has access to a database 125 containing locally stored content codes 210-N, may be any type of computerized device such as a personal computer, workstation, portable computing device, console, laptop, network terminal or the like. Both the computer system 110 and the database 125 are communication with the policy server 120. An input device 116 (e.g., one or more user/developer controlled devices such as a keyboard, mouse, etc.) couples to processor 113 through I/O interface 114, and enables a user 108 to provide input commands, and generally control the graphical user interface 160 that the content rendering application 140-1 and process 140-2 provides on the display 130. The graphical user interface 160 displays a rendition of content 150, containing a content code 155. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a content rendering application 140-1 as explained herein. The content rendering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the content rendering application 140-1. Execution of content rendering application 140-1 in this manner produces processing functionality in a content rendering process 140-2. In other words, the content rendering process 140-2 represents one or more portions or runtime instances of the content rendering application 140-1 (or the entire content rendering application 140-1) performing or executing within or upon the processor 113 in the computerized device 110 at runtime.

It is noted that example configurations disclosed herein include the content rendering application 140-1 (i.e., in the form of un-executed or non-performing logic instructions and/or data). The content rendering application 140-1 may be stored on a computer readable medium (such as a floppy disk), hard disk, electronic, magnetic, optical, or other computer readable medium. The content rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the content rendering application 140-1 in the processor 113 as the content rendering process 140-2 including the file list generation process 150. Those skilled in the art will understand that the computer system 110 may include other processes and/or software and hardware components, such as an operating system not shown in this example.

A display 130 need not be coupled directly to computer system 110. For example, the content rendering application 140-1 can be executed on a remotely accessible computerized device via the network interface 115. In this instance, the graphical user interface 160 may be displayed locally to a user of the remote computer and execution of the processing herein may be client-server based.

Figure 2:
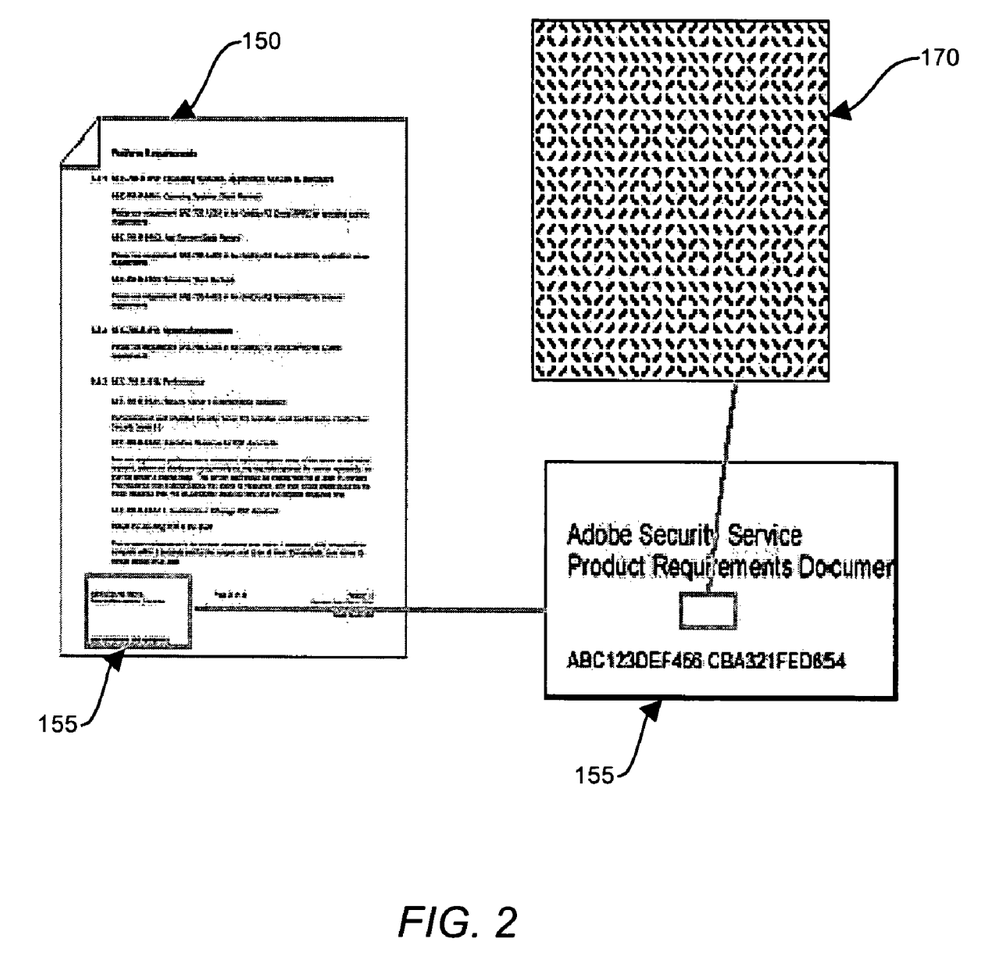
FIG. 2 shows a screen shot of the system of FIG. 1 displaying a rendition of content, a content code and a watermark 170, according to one embodiment disclosed herein.

FIG. 2 provides an example screen shot of a rendition of content 150 containing a content code 155 and a watermark 170 produced by the content rendering process 140-2 disclosed herein. This figure will be discussed in more detail in conjunction with flow charts that follow below.

Further details of configurations explained herein will now be provided with respect to a flow chart of processing steps that show the high level operations disclosed herein to perform the content rendering process 140-2.

Figure 3:
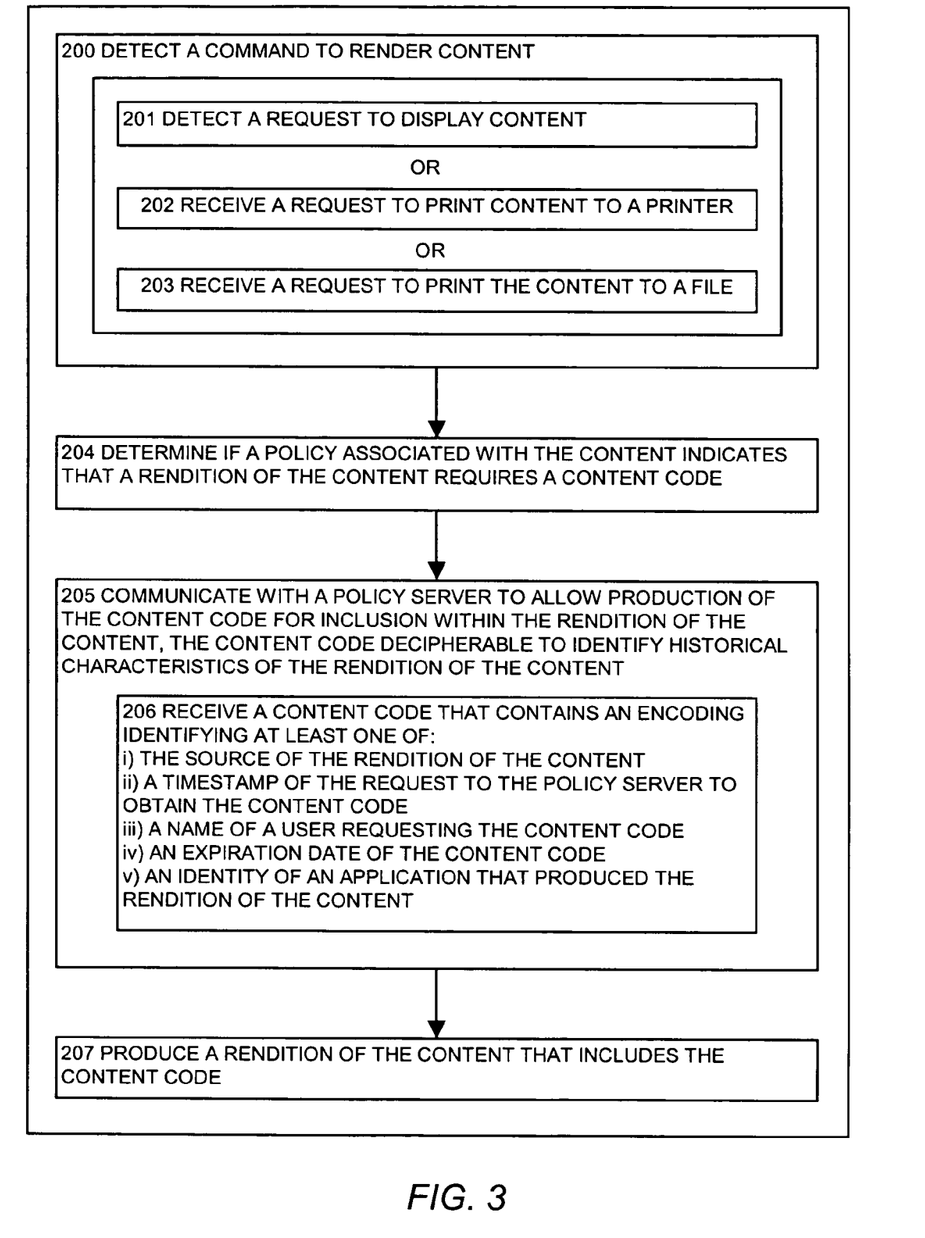
FIG. 3 illustrates a flowchart of a procedure performed by the system of FIG. 1 when the content rendering process detects a command to render content, according to one embodiment disclosed herein.

FIG. 3 is a flowchart of the steps performed by the content rendering process 140-2 when it detects a command to render content. The content rendering process detects a command to render content, and determines if a policy associated with the content indicates that a rendition of the content 150 requires a content code 155. The content rendering process communicates with a policy server to allow production of the content code 155 that is to be included in the rendition of the content 150.

In step 200, the content rendering process 140-2 detects a command to render content. For example, the command to render content could come from a user 108 attempting to access (i.e., for viewing) or print (to a file or a printer) a controlled document (i.e. a rendition of the content 150). The user attempting to print a controlled document could be printing to a file, printing to paper, or printing a screen capture, etc. The content rendering process 140-2 can be activated for production and application of a content code as explained herein for any rendering that provides access requested by the user to some of all content within a controlled document. This access may be visual such as a display of the content on a computer display or printer or non-visual such as rendering of the content to a file. A command to render content can thus be a command to open a file for viewing on a computer monitor or display, or may be a command to produce a hardcopy output of the content on paper, film, or other physical medium, or may be a command to print to a file, or write the content to any computer readable medium.

In step 201, the content rendering process 140-2 detects a request to display content. In one example configuration, a user 108 attempts to open a controlled document (i.e. a rendition of the content 150). For example, the user 108 could attempt to open the controlled document within a document editor. The user could also attempt to open screen shots of a controlled document taken previously when the controlled document was opened within a document editor. That is, a user 108 could open a controlled document within a document editor, select the print screen button (i.e. the "PrtScn" button on the keyboard), paste the screen shot into an image editor, and save the image. This saved image can now be accessed by any other tool in which images can be viewed (i.e. an image editor, a web page editor, etc), viewed and/or printed.

Alternatively, in step 202, the content rendering process 140-2 receives a request to print content to a printer. For example, the user 108 could attempt to print a controlled document (i.e. a rendition of the content 150) already open within a document editor, or the user 108 could attempt to print the controlled document without accessing the controlled document within a document editor. That is, a user could navigate to the directory on the computer system 110 that contains the controlled document, and using an input device 116 (such as a mouse, etc), select the controlled document, right click on the controlled document, and print the controlled document without opening the controlled document within a document editor.

Alternatively, in step 203, the content rendering process 140-2 receives a request to print the content to a file. For example, the user 108 could attempt to convert the controlled document (i.e. a rendition of the content 150) to a different document format (i.e. such as converting a MSWord document to an Adobe Acrobat file), thereby printing the controlled document to a file.

In step 204, the content rendering process 140-2 determines if a policy associated with the content indicates that a rendition of the content 150 requires a content code 155. In one configuration, a controlled document (i.e. a rendition of the content 150) registers with a policy server 120 prior to the controlled document being made available for accessing or printing. Each rendition of the content 150 registered with the policy server 120 has a policy associated with it. The policy determines whether or not that rendition of the content 150 requires a content code 155.

In step 205, the content rendering process 140-2 communicates with a policy server 120 to allow production of the content code 155 for inclusion within the rendition of the content 150. The content code 155 is decipherable within the policy server 120 to identify historical characteristics of the rendition of the content 150. Step 206 illustrates further details of the historical characteristics identified within the content code 155.

In step 206, the content rendering process 140-2 receives a content code 155 that contains an encoding identifying at least one of the following five historical characteristics of the rendition of content 150:

i) the source of the rendition of the content 150 (e.g. a filename and path)

ii) a timestamp of the request to the policy server 120 to obtain the content code 155 iii) a name of a user 108 requesting the content code 155 iv) an expiration date of the content code 155 v) an identity of an application that produced the rendition of the content 150.

Note that other information may be encoded within the content code 155 as well, such as In step 207, the content rendering process 140-2 produces a rendition of the content 150 that includes the content code 155. FIG. 2 illustrates a screen shot of a rendition of content 150 containing a content code 155 and a watermark 170 produced by the content rendering process 140-2.

Figure 4:
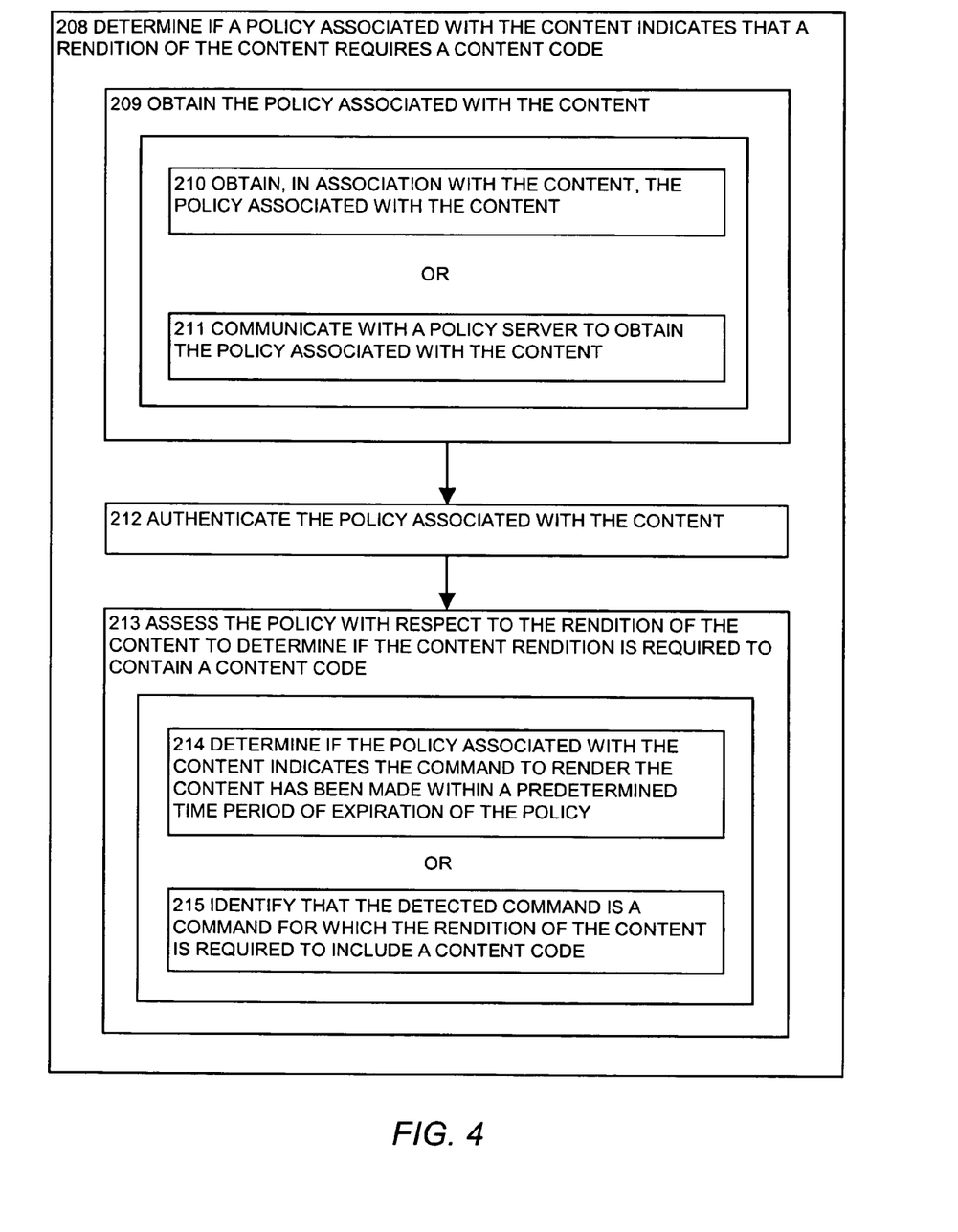
FIG. 4 illustrates a flowchart of a procedure performed by the system of FIG. 1 when the content rendering process determines if a policy associated with the content indicates that a rendition of the content requires a content code, according to one embodiment disclosed herein.

FIG. 4 is a flowchart of the steps performed by the content rendering process 140-2 when it determines if a policy associated with the content indicates that a rendition of the content 150 requires a content code 155. For example, a controlled document might need a content code 155 whereas a non-controlled document might not.

In step 208, as previously explained in step 204, the content rendering process 140-2 determines if a policy associated with the content indicates that a rendition of the content 150 requires a content code 155.

In step 209, the content rendering process 140-2 obtains the policy associated with the content. Further details regarding obtaining the policy associated with the content are explained within the sub steps of 210 and 211.

In step 210, the content rendering process 140-2 obtains, in association with the content, the policy associated with the content. In one configuration, the content has previously obtained the policy from the policy server 120, and that policy is already associated with the content. In this example, the content rendering process 140-2 can obtain the policy in association with the content.

Alternatively, in step 211, the content rendering process 140-2 communicates with a policy server 120 to obtain the policy associated with the content. For example, when a user 108 attempts to access a controlled document (i.e. a rendition of content 150), the content rendering process 140-2 contacts the policy server 120 to obtain the policy associated with that controlled document. The content rendering process 140-2 then receives the policy associated with the controlled document from the policy server 120.

In step 212, the content rendering process 140-2 authenticates the policy associated with the content. When the content rendering process 140-2 obtains the policy associated with the content, the content rendering process 140-2 authenticates the policy to verify it is, indeed, associated with that content, and that the policy is still valid, (i.e. not expired).

In step 213, the content rendering process 140-2 assesses the policy with respect to the rendition of the content 150 to determine if the content rendition is required to contain a content code 155. Further details regarding assesses the policy with respect to the rendition of the content 150 are explained within the sub steps of 214 and 215.

In step 214, the content rendering process 140-2 determines if the policy associated with the content indicates the command to render the content has been made within a predetermined time period of expiration of the policy. In one configuration, the policy associated with the rendition of content 150 contains an expiration date. The content rendering policy 140-2 examines the policy to determine if the policy associated with the rendition of content 150 has expired.

Alternatively, in step 215, the content rendering process 140-2 identifies that the detected command is a command for which the rendition of the content 150 is required to include a content code 155. For example, if a user 108 attempts to open a controlled document for viewing or printing (i.e. a rendition of the content 150), the content rendering process 140-2 identifies the 'open' command as a command requiring a content code 155, when the 'open' command is executed on this controlled document.

Figure 5:
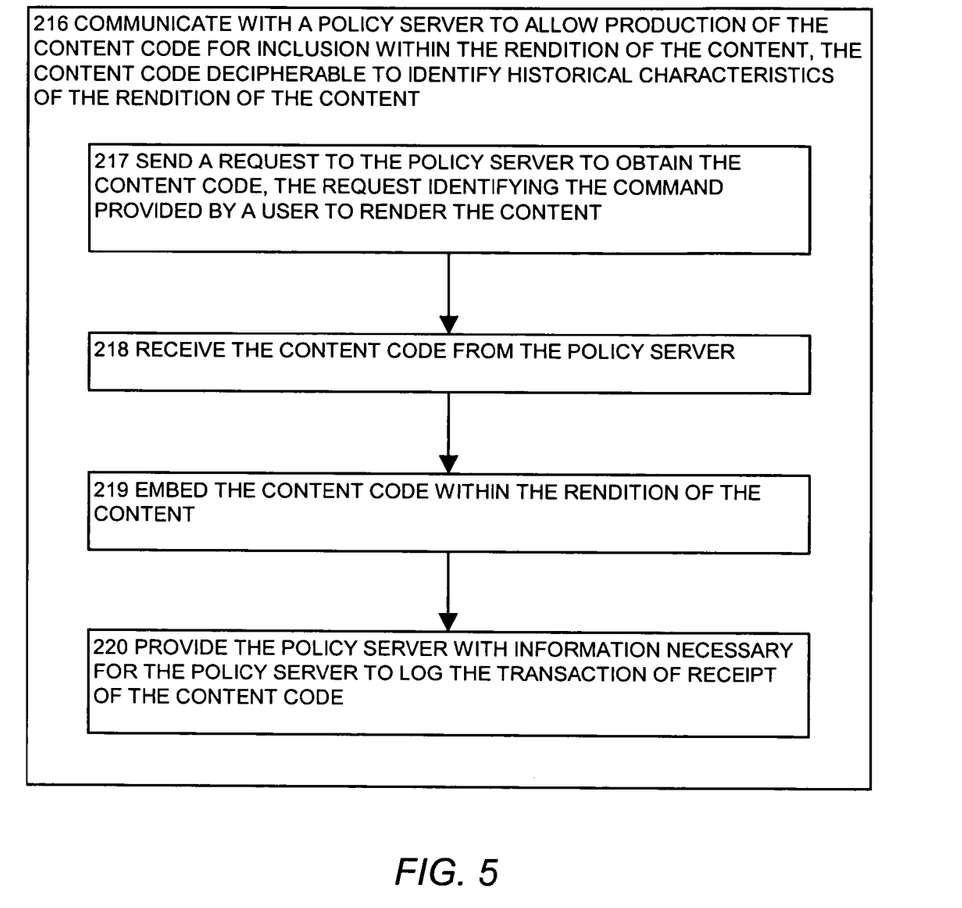
FIG. 5 illustrates a flowchart of a procedure performed by the system of FIG. 1 when the content rendering process communicates with a policy server to allow production of the content code for inclusion within the rendition of the content, the content code decipherable to identify historical characteristics of the rendition of the content, according to one embodiment disclosed herein.

FIG. 5 is a flowchart of the steps performed by the content rendering process 140-2 when it communicates with a policy server 120 to allow production of the content code 155. The content code 155 is received from the policy server 120, and is included within the rendition of the content 150.

In step 216, the content rendering process 140-2 communicates with a policy server 120 to allow production of the content code 155. The content code 155 is included within the rendition of the content 150. The content code 155 is decipherable to identify historical characteristics of the rendition of the content 150.

In step 217, the content rendering process 140-2 sends a request to the policy server 120 to obtain the content code 155. The request identifies the command provided by a user 108 to render the content. For example, the command provided by the user 108 might include opening, displaying, or printing the content.

In step 218, the content rendering process 140-2 receives the content code 155 from the policy server 120. In one configuration, a unique content code is generated each time a rendition of content is accessed. An example screen shot of a content code 155 is illustrated in FIG. 2.

In step 219, the content rendering process 140-2 embeds the content code 155 within the rendition of the content 150. In one configuration, the content code 155 is embedded within the rendition of content 150 such that it is impossible to remove the content code 155 from the rendition of content 150 without destroying the integrity of the rendition of content 150. An example screen shot of a rendition of content 150 containing an embedded content code 155 is illustrated in FIG. 2.

In step 220, the content rendering process 140-2 provides the policy server 120 with information necessary for the policy server 120 to log the transaction of receipt of the content code 155. In one configuration, the content code 155 identifies a document ID, a user 108, and an access (i.e. opening, displaying, printing, etc) event. A policy server administrator can look up unique information to obtain the event logs, such as receipt of the content code 155.

Figure 6:
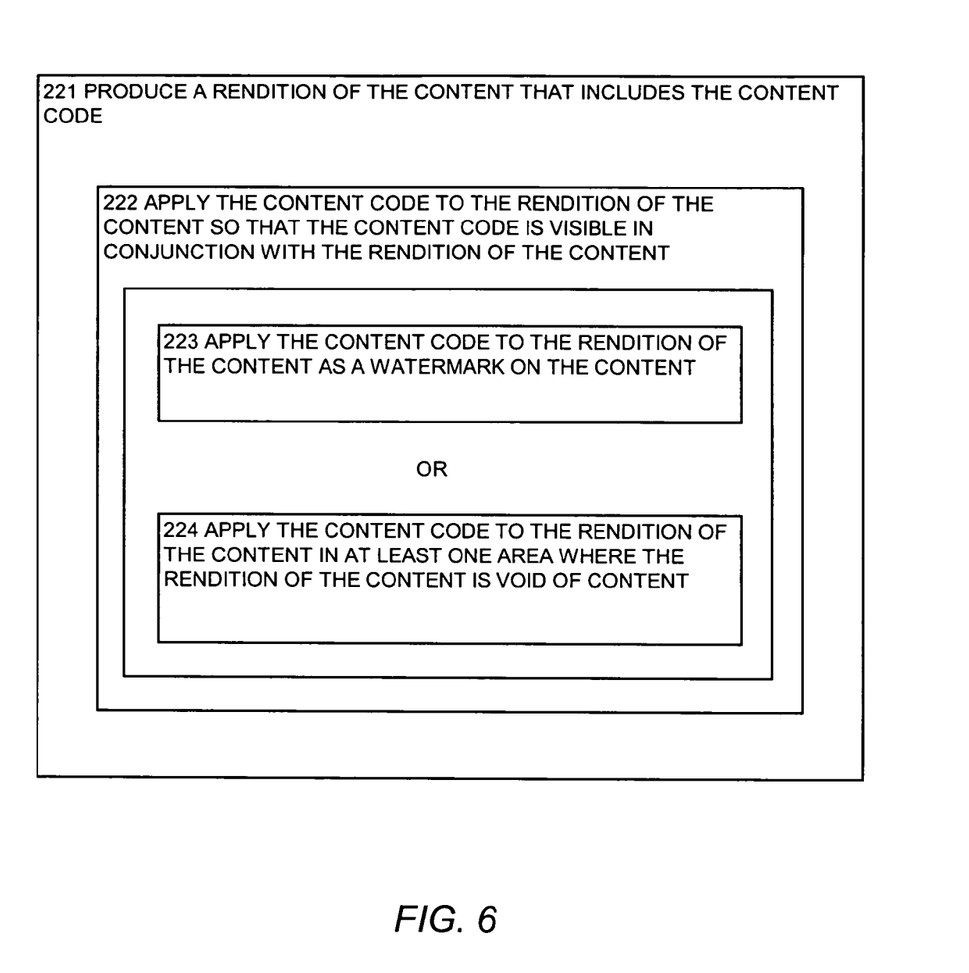
FIG. 6 illustrates a flowchart of a procedure performed by the system of FIG. 1 when the content rendering process produces a rendition of the content that includes the content code, according to one embodiment disclosed herein.

FIG. 6 is a flowchart of the steps performed by the content rendering process 140-2 when it produces a rendition of the content 150 that includes the content code 155. Examining the rendition of content 150 that includes the content code 155 reveals unique identifying information pertaining to the rendition of content 150.

In step 221, the content rendering process 140-2 produced a rendition of the content 150 that includes the content code 155. FIG. 2 illustrates a screen shot of a rendition of content 150 containing a content code 155 and a watermark 170 produced by the content rendering process 140-2. Further details of applying the content code 155 to the rendition of content 150 will be explained within the sub steps of 222 through 224.

In step 222, the content rendering process 140-2 applies the content code 155 to the rendition of the content 150 so that the content code 155 is visible in conjunction with the rendition of the content 150. For example, the content code 155 is visible regardless of whether the rendition of content 150 is displayed within a document editor, a web editor, a photograph editor, or printed out as a hard copy.

In step 223, the content rendering process 140-2 applies the content code 155 to the rendition of the content 150 as a watermark 170 on the content. That is, in one configuration, the content code 155 includes or is the watermark 170. In one configuration, the watermark 170 is intentionally undecipherable to a user 108, and only decipherable to an authorized user, such as an administrator of the policy server 120. Thus, if a rendition of content 150 falls into the wrong hands, no additional information will be gleaned from the content code 155 and/or the watermark 170.

Alternatively, in step 224, the content rendering process 140-2 applies the content code 155 to the rendition of the content 150 in at least one area where the rendition of the content 150 is void of content. For example, the content code 155 might be placed along the margins of the page(s) containing the rendition of content 150, or in between the lines of the content printed within the rendition of content 150.

Figure 7:
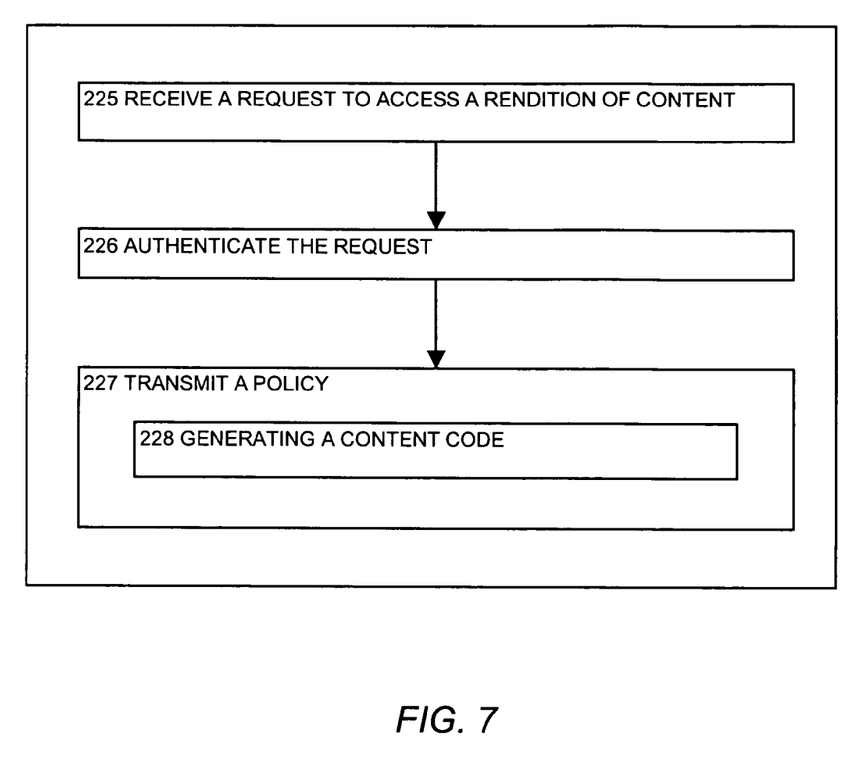
FIG. 7 illustrates a flowchart of a procedure performed by the system of FIG. 1 when the content rendering process receives a request to access a rendition of content, according to one embodiment disclosed herein.

FIG. 7 is a flowchart of the steps performed by the policy server 120 when it receives a request to access a rendition of content 150. In one configuration, the request is sent from the content rendering process 140-2.

In step 225, the policy server 120 receives a request to access a rendition of content 150. For example, the request might be to access, display or print a rendition of content 150. In receiving the request, the policy server 120 is able to identify the rendition of content 150 and the user 108 generating the request.

In step 226, policy server 120 authenticates the request. For example, the policy server 120 can determine a user 108 has permission to access a rendition of content 150, but not to print that rendition of content 150.

In step 227, policy server 120 transmits a policy back to the content rendering process 140-2.

In step 228, the policy server 120 generates a content code 155. For example, the content code 155 might be a bar code, a unique number, stealth glyph, etc. The content code 155 would be generated in such as way that the content code 155 could not be removed from the rendition of content 150 once applied to the rendition of content 150.

Figure 8:
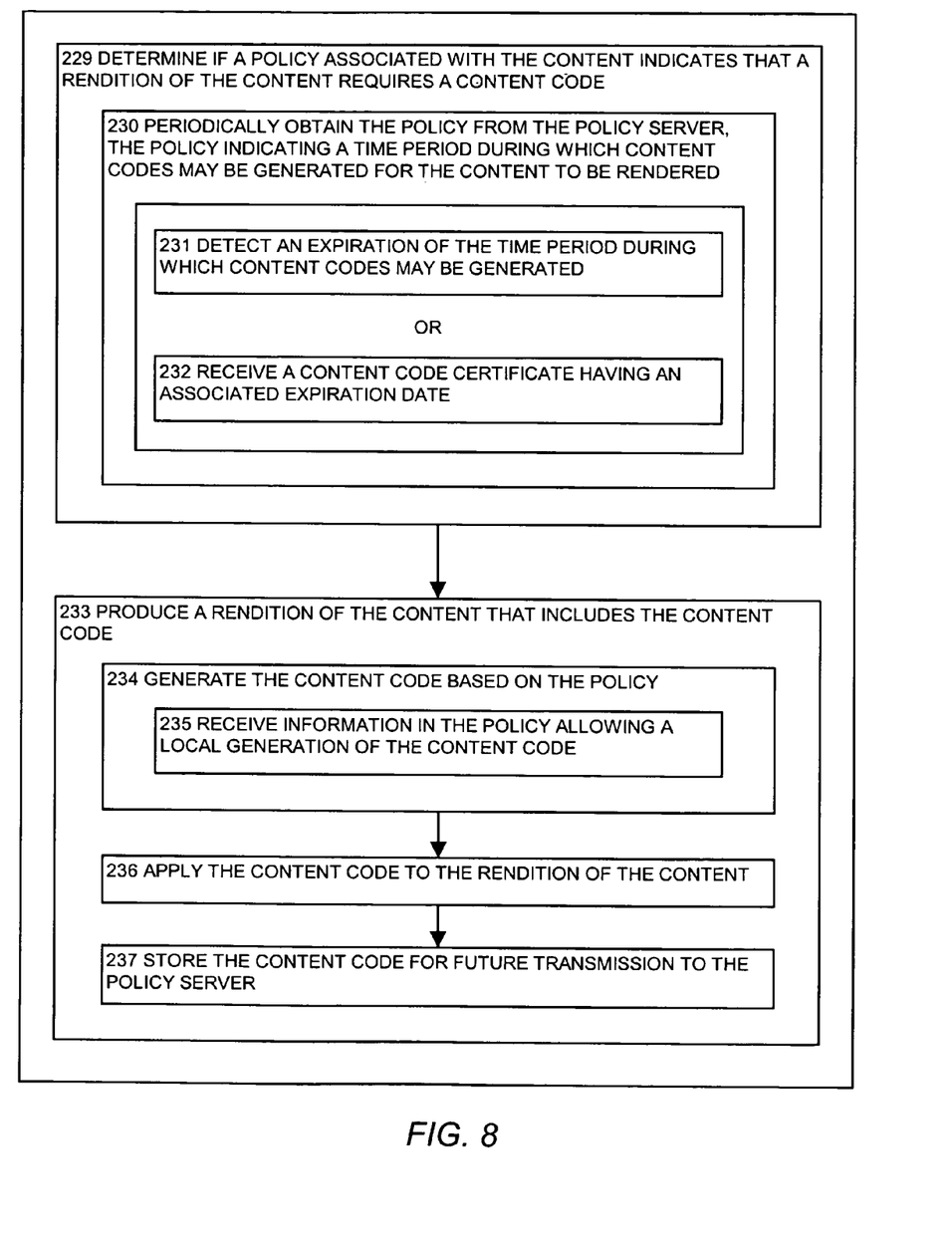
FIG. 8 illustrates a flowchart of a procedure performed by the system of FIG. 1 when the content rendering process determines if a policy associated with the content indicates that a rendition of the content requires a content code, according to one embodiment disclosed herein.

FIG. 8 is a flowchart of the steps performed by the content rendering process 140-2 when it communicates with the policy server 120 prior to both detecting a command to render content, and determining if a policy associated with the content requires a content code 155. The content rendering process 140-2 communicates with the policy server 120 to allow production of the content code 155 for inclusion within the rendition of the content 150. The content rendering process 140-2 also determines if a policy associated with the content indicates that a rendition of the content 150 requires a content code 155. The content rendering process 140-2 obtains the policy for a rendition of content 150 prior to a user 108 attempting to access the rendition of content 150. For example, a user 108 might need to access the rendition of content 150 during a period of time in which the content rendering process 140-2 is not able to communicate with the policy server 120. For example, a user 108 might have to access documents on a laptop that is not connected to a network.

In step 229, the content rendering process 140-2 determines if a policy associated with the content indicates that a rendition of the content 150 requires a content code 155. In one configuration, a user registers a controlled document (such as a file stored in a directory) with a policy server 120 prior to the controlled document being made available for accessing (e.g. viewing on a graphical user interface) or printing to a file or a printer. Each controlled document registered with the policy server 120 has a policy associated with it. The policy would determine whether or not a rendition of the content 150 (such as a printout or a display of the content on a graphical user interface) requires a content code 155.

In step 230, the content rendering process 140-2 periodically obtains the policy from the policy server 120. The policy indicates a time period during which content codes 150 may be generated for the content to be rendered. For example, a user 108 obtains a policy from the policy server 120 and the policy has an associated lease or time period during which the policy is valid. The user 108 is allowed to access the portion of content 150 for as long as that lease is valid (i.e. has not expired).

In step 231, the content rendering process 140-2 detects an expiration of the time period during which content codes may be generated. For example, a user 108 attempts to access a rendition of content 150 where the policy associated with that rendition of content 150 has expired. The content rendering process 140-2 detects the policy associated with that rendition of content 150 has expired. The content rendering process 140-2 then denies the user 108 access to that rendition of content 150. In one configuration, the user 108 is allowed to access the rendition of content 150, but not allowed to print the rendition of content 150.

Alternatively, in step 232, the content rendering process 140-2 receives a content code certificate having an associated expiration date. For example, the content rendering process 140-2 receives a content code 155 from the policy server 120 that has an expiration date. The content code 155 is not valid after that expiration date.

In step 233, the content rendering process 140-2 produces a rendition of the content that includes the content code 155. FIG. 2 illustrates a screen shot of a rendition of content 150 containing a content code 155, and a watermark 170 produced by the content rendering process 140-2.

In step 234, the content rendering process 140-2 generates the content code 155 based on the policy received from the policy server 120.

In step 235, the content rendering process 140-2 receives information in the policy allowing a local generation of the content code 155. For example, if the content rendering process 140-2 has contacted the policy server 120 prior to detecting a command to render content or prior to determining the content requires a content code 155, and received a policy with an expiration date, the content rendering process 140-2 generates the content code 155 locally for application to the rendition of content 150. That is, the content rendering process 140-2 generates the content code 155 without contacting the policy server 120 at the time the content code 155 is generated.

In step 236, the content rendering process 140-2 applies the content code 155 to the rendition of the content 150. The content rendering process 140-2 applies the locally generated content code 155 to the rendition of content 150.

In step 237, the content rendering process 140-2 stores the content code 155 for future transmission to the policy server 120. The locally generated content code 155 is stored on the computer system 110 until such time when the content rendering process 140-2 is able to connect to the policy server 120 to upload the stored content codes 210-N.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method for rendering content, the method comprising:
   detecting a command to visually render content;
   determining if a policy associated with the content indicates that a rendition of the content requires a content code, the rendition of the content comprising a visual rendition of the content;
   communicating with a policy server to allow production of the content code for inclusion within the rendition of the content, the content code including decipherable historical characteristics of the rendition of the content; and
   producing a rendition of the content that includes the content code, which includes applying the content code to the rendition of the content so that the content code is visible in conjunction with the rendition of the content.

2. The method of claim 1 wherein detecting a command to render content comprises at least one of:
   detecting a request to display content;
   receiving a request to print content to a printer; and
   receiving a request to print the content to a file.

3. The method of claim 2 wherein communicating with a policy server to obtain the content code for inclusion within the rendition of the content comprises:
   receiving a content code that contains an encoding identifying at least one of:
   i) the source of the rendition of the content;
   ii) a timestamp of the request to the policy server to obtain the content code;
   iii) a name of a user requesting the content code;
   iv) an expiration date of the content code; and
   v) an identity of an application that produced the rendition of the content.

4. The method of claim 1 wherein determining if a policy associated with the content indicates that a rendition of the content requires a content code comprises:
   obtaining the policy associated with the content;
   authenticating the policy associated with the content; and
   assessing the policy with respect to the rendition of the content to determine if the content rendition is required to contain a content code.

5. The method of claim 4 wherein obtaining the policy associated with the content comprises:
   obtaining, in association with the content, the policy associated with the content.

6. The method of claim 4 wherein obtaining the policy associated with the content comprises:
   communicating with a policy server to obtain the policy associated with the content.

7. The method of claim 4 wherein assessing the policy with respect to the rendition of the content comprises:
   determining if the policy associated with the content indicates the command to render the content has been made within a predetermined time period of expiration of the policy.

8. The method of claim 4 wherein assessing the policy with respect to the rendition of the content comprises:
   identifying that the detected command is a command for which the rendition of the content is required to include a content code.

9. The method of claim 1 wherein communicating with a policy server to obtain the content code for inclusion within the rendition of the content comprises:
   sending a request to the policy server to obtain the content code, the request identifying the command provided by a user to render the content;
   receiving the content code from the policy server, the content code stored on the policy server; and
   embedding the content code within the rendition of the content.

10. The method of claim 9 comprising;
    providing the policy server with information necessary for the policy server to log the transaction of receipt of the content code.

11. The method of claim 1 wherein applying the content code to the rendition of the content comprises at least one of:
    applying the content code to the rendition of the content as a watermark on the content; and
    applying the content code to the rendition of the content in at least one area where the rendition of the content is void of content.

12. The method of claim 1 wherein communicating with a policy server to allow production of the content code for inclusion within the rendition of the content is performed prior to detecting a command to render content and determining if a policy associated with the content indicates that a rendition of the content requires a content code and comprises:

periodically obtaining the policy from the policy server, the policy indicating a time period during which content codes may be generated for the content to be rendered;

and wherein producing a rendition of the content that includes the content code comprises:

generating the content code based on the policy;

applying the content code to the rendition of the content; and storing the content code for future transmission to the policy server.

13. The method of claim 12 wherein periodically obtaining the policy from the policy server, the policy indicating a time period during which content codes may be generated comprises:

detecting an expiration of the time period during which content codes may be generated.

14. The method of claim 12 wherein periodically obtaining the policy from the policy server, the policy indicating a time period during which content codes may be generated comprises:

receiving a content code certificate having an associated expiration date.

15. The method of claim 12 wherein generating the content code based on the policy comprises:

receiving information in the policy allowing a local generation of the content code.

16. The method as in claim 1, wherein applying the content code to the rendition of the content so that the content code is visible in conjunction with the rendition of the content includes:

concurrently presenting the content code as part of the rendition of the content, the historical characteristics comprising data about a rendition event that produced the rendition of the content, the historical characteristics visible to any user and decipherable by an authorized user.

17. The method as in claim 1, wherein applying the content code to the rendition of the content so that the content code is visible in conjunction with the rendition of the content includes:

creating data for concurrently electronically displaying the content;

upon detecting a request to print the content:

creating data to print the rendition of the content during a print event, the content code visibly included within the rendition of the content, the content code comprising decipherable data about the print event, the rendition of the content comprising a printed document displaying the content.

18. A computerized device comprising:

a memory;

a processor;

a communications interface;

an interconnection mechanism coupling the memory, the processor and the communications interface;

wherein the memory is encoded with an content rendering application that when executed on the processor renders content on the computerized device by performing the operations of:

detecting a command to visually render content;

determining if a policy associated with the content indicates that a rendition of the content requires a content code;

communicating with a policy server to allow production of the content code for inclusion within the rendition of the content, the content code including decipherable historical characteristics of the rendition of the content; and producing a rendition of the content that includes the content code, which includes applying the content code to the rendition of the content so that the content code is visible in conjunction with the rendition of the content.

19. The computerized device of claim 18 wherein when the computerized device performs the operation of communicating with a policy server to obtain the content code for inclusion within the rendition of the content, the computerized device performs the operation of:

receiving a content code that contains an encoding identifying at least one of:

i) the source of the rendition of the content;

ii) timestamp of the request to the policy server to obtain the content code;

iii) a name of a user requesting the content code;

iv) an expiration date of the content code; and v) an identity of an application that produced the rendition of the content.

20. The computerized device of claim 18 wherein when the computerized device performs the operation of communicating with a policy server to obtain the content code for inclusion within the rendition of the content, the computerized device performs the operations of:

sending a request to the policy server to obtain the content code, the request identifying the command provided by a user to render the content;

receiving the content code from the policy server, the content code stored on the policy server; and embedding the content code within the rendition of the content.

21. The computerized device of claim 20 wherein the computerized device performs the operation of;

providing the policy server with information necessary for the policy server to log the transaction of receipt of the content code.

22. The computerized device of claim 18 wherein when the computerized device performs the operation of applying the content code to the rendition of the content, the computerized device performs the operation of at least one of:

applying the content code to the rendition of the content as a watermark on the content; and applying the content code to the rendition of the content in at least one area where the rendition of the content is void of content.

23. The computerized device of claim 18 wherein when the computerized device performs the operation of communicating with a policy server to allow production of the content code for inclusion within the rendition of the content, the operation is performed prior to detecting a command to render content and determining if a policy associated with the content indicates that a rendition of the content requires a content code and the computerized device performs the operation of:

periodically obtaining the policy from the policy server, the policy indicating a time period during which content codes may be generated for the content to be rendered;

and wherein when the computerized device performs the operation of producing a rendition of the content that includes the content code, the computerized device performs the operations of:

generating the content code based on the policy;

applying the content code to the rendition of the content; and     storing the content code for future transmission to the policy server.

24. A computer readable medium encoded with computer programming logic that when executed on a process in a computerized device produces a content rendering process that renders content by causing the computerized device to perform the operations of:

detecting a command to visually render content;

determining if a policy associated with the content indicates that a rendition of the content requires a content code;

communicating with a policy server to allow production of the content code for inclusion within the rendition of the content, the content code including decipherable historical characteristics of the rendition of the content; and     producing a rendition of the content that includes the content code, which includes applying the content code to the rendition of the content so that the content code is visible in conjunction with the rendition of the content.

25. A computerized device comprising:

a memory;

a processor;

a communications interface;

an interconnection mechanism coupling the memory, the processor and the communications interface;

where the memory is encoded with a content rendering application that when executed on the processor configures the computerized device with a means for rendering content, the means including:

means for detecting a command to visually render content;

means for determining if a policy associated with the content indicates that a rendition of the content requires a content code;

means for communicating with a policy server to allow production of the content code for inclusion within the rendition of the content, the content code including decipherable to historical characteristics of the rendition of the content; and     means for producing a rendition of the content that includes the content code, which includes applying the content code to the rendition of the content so that the content code is visible in conjunction with the rendition of the content.

* * * * *